United States Patent
Shaw et al.

(10) Patent No.: US 7,119,789 B1
(45) Date of Patent: Oct. 10, 2006

(54) HAPTIC INTERFACE INCLUDING CLUTCH CONTROL

(75) Inventors: Robert S. Shaw, Santa Cruz, CA (US); Scott S. Snibbe, San Francisco, CA (US); William L. Verplank, Menlo Park, CA (US); Karon E. MacLean, Palo Alto, CA (US)

(73) Assignee: Vulcan Patents LLC, Seattle, WA (US)

( * ) Notice: Subject to any disclaimer, the term of this patent is extended or adjusted under 35 U.S.C. 154(b) by 311 days.

(21) Appl. No.: 10/346,559

(22) Filed: Jan. 17, 2003

Related U.S. Application Data (63) Continuation of application No. 09/344,327, filed on Jun. 24, 1999, now Pat. No. 6,525,711.

(51) Int. Cl.
  *G09G 5/08* (2006.01)
  *G06F 3/00* (2006.01)
  *G09G 5/00* (2006.01)
  *G06F 1/16* (2006.01)
  *G09B 9/08* (2006.01)

(52) U.S. Cl. ............... 345/156; 345/161; 345/167; 345/184; 361/683; 434/45; 715/701; 715/702

(58) Field of Classification Search ........ 345/156–159, 345/161, 163–167, 184
See application file for complete search history.

(56) References Cited

U.S. PATENT DOCUMENTS

| | | | |
|---|---|---|---|
| 5,185,561 A | 2/1993 | Good et al. ............. 318/432 |
| 5,907,487 A * | 5/1999 | Rosenberg et al. ............ 700/85 |
| 5,999,168 A * | 12/1999 | Rosenberg et al. ......... 345/161 |
| 6,002,184 A * | 12/1999 | Delson et al. ................ 310/14 |
| 6,005,551 A * | 12/1999 | Osborne et al. ............ 345/161 |
| 6,046,726 A | 4/2000 | Keyson ....................... 345/156 |
| 6,100,874 A | 8/2000 | Schena et al. .............. 345/157 |
| 6,154,201 A * | 11/2000 | Levin et al. ................ 345/184 |
| 6,320,487 B1 | 11/2001 | Miller et al. ................ 335/274 |

FOREIGN PATENT DOCUMENTS

| WO | WO 95/20788 | 8/1995 |
|---|---|---|

\* cited by examiner

*Primary Examiner*—Sumati Lefkowitz
*Assistant Examiner*—Alexander S. Beck
(74) *Attorney, Agent, or Firm*—Van Pelt, Yi & James LLP (57) ABSTRACT

A user can selectively engage some part or all of the haptic display of a haptic interface device to produce an enhanced interaction with an environment with which the user interacts using the haptic interface device. Further, the haptic interface device can be implemented so that the part of the haptic display that is engaged can be engaged to varying degree. The degree of engagement with the haptic display (together with whether part or all of the haptic display is engaged) determines the manner in which the haptic display is experienced by the user. The selective engagement with the haptic display is enabled by adding a haptic clutch model to the underlying haptic model used to produce the haptic display, the haptic clutch model engaging some part or all of the haptic model in response to user input. The addition of a haptic clutch model to the haptic model used to produce a haptic display provides a richer user interaction than is provided by a haptic display produced by the haptic model alone.

10 Claims, 6 Drawing Sheets

HAPTIC INTERFACE INCLUDING CLUTCH CONTROL

This application is a continuation of U.S. patent application Ser. No. 09/344,327, entitled HAPTIC INTERFACE INCLUDING CLUTCH CONTROL filed Jun. 24, 1999 (now U.S. Pat. No. 6,525,711) which is incorporated herein by reference for all purposes.

BACKGROUND OF THE INVENTION

1. Field of the Invention

This invention relates to haptic interfaces and, in particular, to enabling a user to selectively engage at least part of the haptic display of a haptic interface device to produce an enhanced interaction with an environment with which the user interacts using the haptic interface device.

2. Related Art

A "haptic interface device" provides a haptic sensation (haptic display) to a user of the haptic interface device in response to the user's interaction with an environment with which the haptic interface device is associated. "Haptic" refers to the sense of touch: haptic interface display devices thus produce sensations associated with the sense of touch, such as texture, force (e.g., frictional force, magnetic repulsion or attraction), vibration, mass, density, viscosity, temperature, moisture, or some combination of such sensations. Haptic interface devices can be embodied in a variety of different apparatus, such as, for example, apparatus for conveying force and/or vibrotactile sensation (e.g., a stylus, a movable arm, a wheel, a dial, a roller, a slider or a vibratory surface), apparatus for conveying thermal sensation (e.g., a thermally-controlled surface or air volume), and apparatus for conveying the sensation of moisture (e.g., a moisture-controlled surface or air volume). Haptic interface devices can be used in a wide variety of applications. For example, some joysticks and mice used with computers incorporate force feedback to provide a haptic display to a user of the joystick or mouse. Some paging devices are adapted to vibrate when a paging signal is received. Some toys produce vibrations as part of the interaction with the toy. These examples give an indication of the range of applications for which a haptic interface device can be used.

Figure 1A:
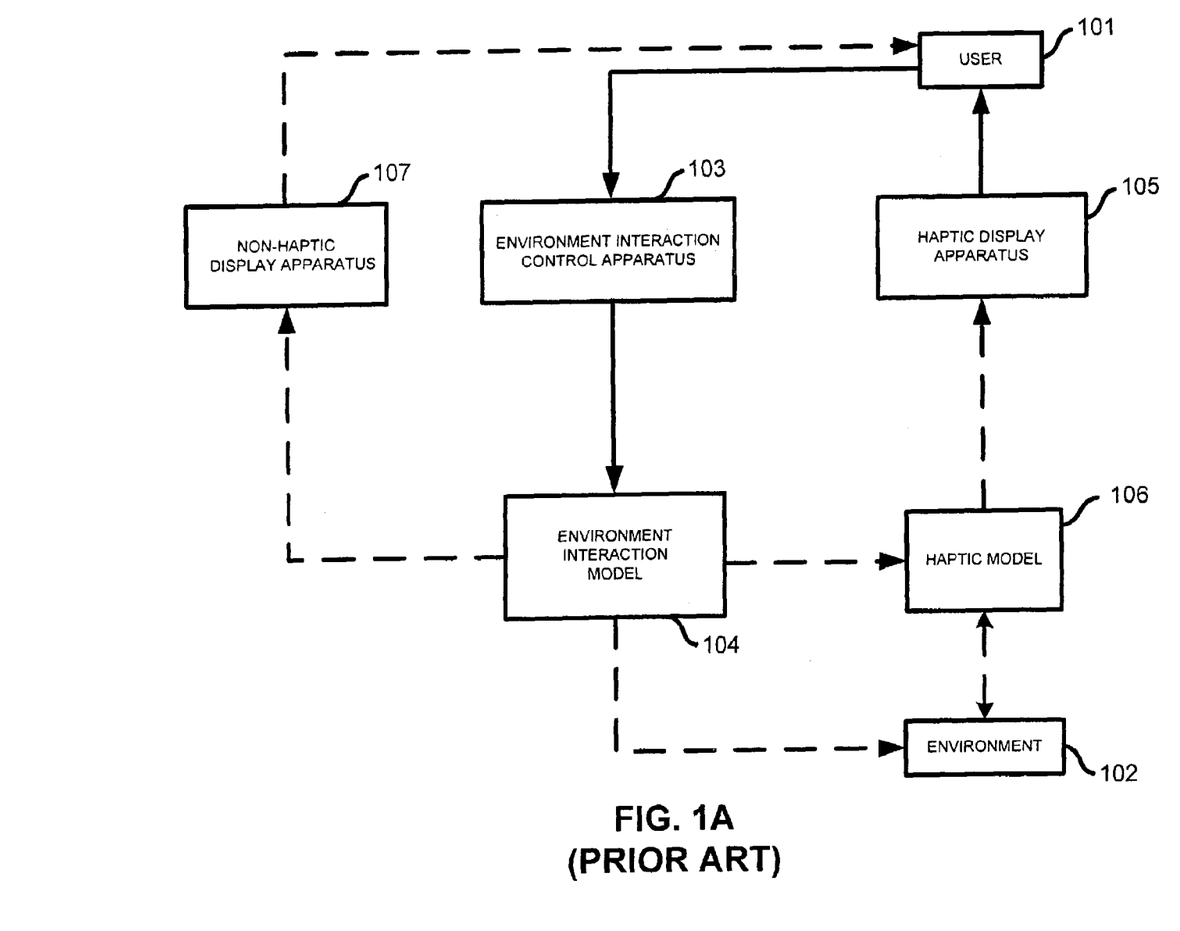
FIG. 1A is a block diagram of the functional components of a conventional haptic interface device.

In a conventional haptic interface device, the character of the haptic display experienced by a user is determined by a haptic model that links the state of one or more aspects of the environment to the haptic sensation provided to the user. This is illustrated in FIG. 1A. A user 101 uses an environment interaction control apparatus 103 to interact with an environment 102 via an environment interaction model 104 (either directly or via a haptic model 106, as indicated in FIG. 1A by the dashed lines between the environment interaction model 104 and the environment 102, and the environment interaction model 104 and the haptic model 106). The haptic model 106 "interprets" the user interaction with the environment 102 (based on information concerning the user interaction obtained either from the environment interaction model 104 or the environment 102, as indicated in FIG. 1A by the dashed line between the environment interaction model 104 and the haptic model 106 and the dashed arrow head entering the haptic model 106 from the environment 102) to cause a haptic display apparatus 105 to produce a corresponding haptic display. The environment interaction model 104 can also cause a non-haptic display apparatus 107 to produce a non-haptic display (e.g., a visual display and/or an audio display). However, there need not necessarily be a non-haptic display (as indicated by the dashed lines between the non-haptic display apparatus 107 and the environment interaction model 104 and user 101).

For example, in a previous haptic interface device used for video browsing and/or editing, a knob can be rotated to advance through the frames of a video recording, a force being applied in opposition to rotation of the knob, to simulate a detent, as transition is made from one video frame to the next. The haptic model in that haptic interface device is a relationship between applied force and position of the knob (which position corresponds to a "position" within the video recording, i.e., whether a transition between video frames is occurring or not). The same haptic display is always provided to the user for any particular user interaction, e.g., a given amount of rotation of the knob always advances the video recording a corresponding number of frames and simulates passing through the corresponding number of detents.

The foregoing is true of many previous haptic interface devices, i.e., the same haptic display is always provided to the user for a particular user interaction (herein, for convenience, such a haptic interface device is said to exhibit "constant" haptic behavior). Such haptic interface devices have not been as versatile as may be desirable.

Figure 1B:
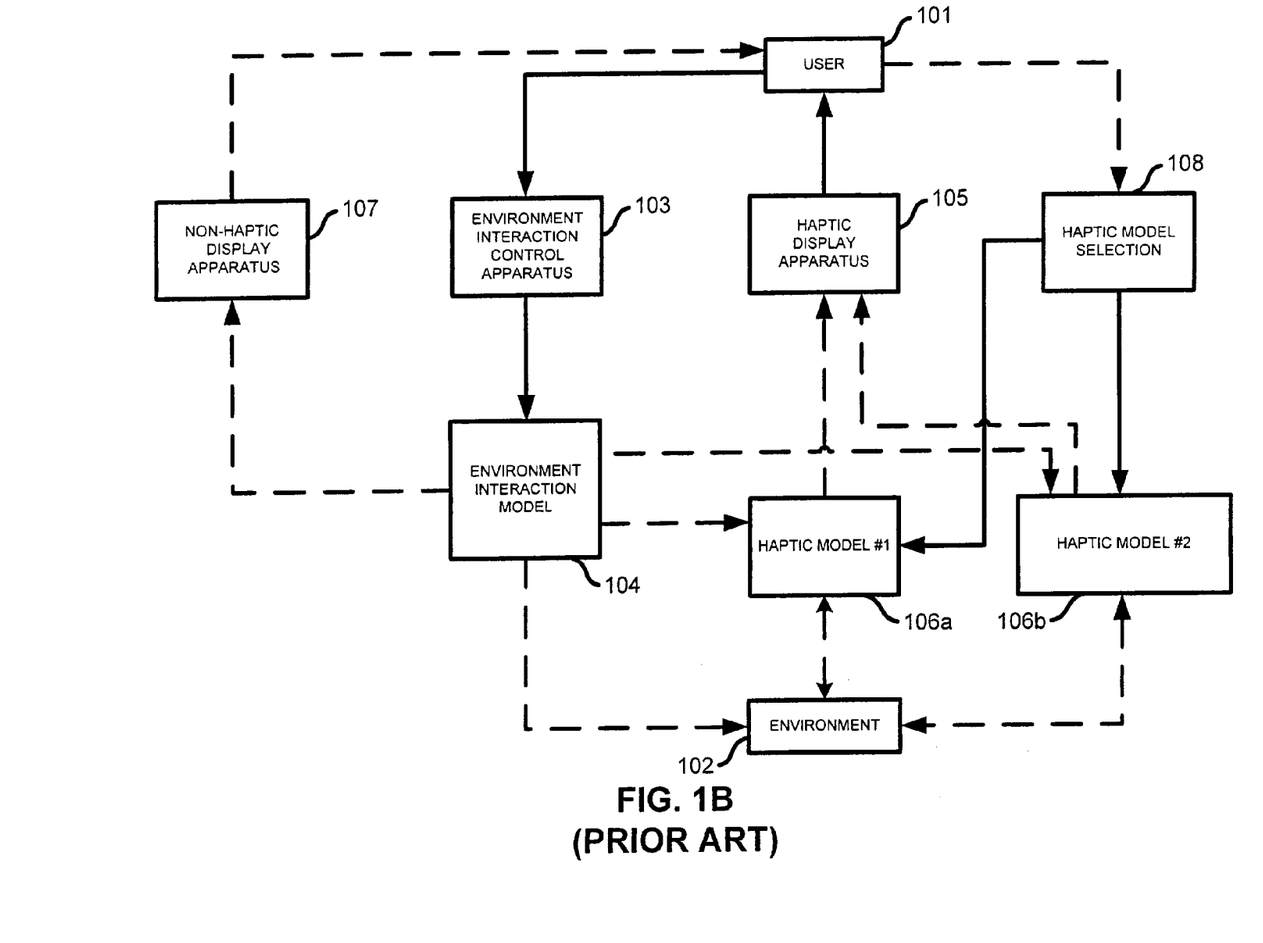
FIG. 1B is a block diagram of the functional components of a system including a reconfigurable haptic interface device.

FIG. 1B is a block diagram of the functional components of a system including a reconfigurable haptic interface device. (The dashed lines and arrow heads in FIG. 1B indicate interactions between components of the system which can, but need not necessarily, occur, depending on the implementation and/or configuration of the system.) In FIG. 1B, a haptic model selection 108 results in the selection of one of two haptic models 106a or 106b for use in producing a haptic display with the haptic display apparatus 105 (i.e., the haptic model selection 108 can be used to reconfigure the haptic interface device). (More than two haptic models can be used; two are shown in FIG. 1B for simplicity.) The haptic model selection 108 may occur, for example, by specifying, before the user 101 begins using the haptic interface device, which haptic model 106a or 106b is to be used in producing the haptic display (e.g., by selecting for execution an appropriate computer program or programs used to implement the haptic model 106a or 106b). The haptic model selection 108 may or may not be made by the user 101 (as indicated by the dashed line between the user 101 and the haptic model selection 108). The haptic models 106a and 106b model different haptic behavior. Thus, unlike the haptic interface device shown in FIG. 1A, in the system shown in FIG. 1B, a particular user interaction can result in different haptic displays, depending on which of the haptic models 106a or 106b is being used to produce the haptic display (i.e., the haptic interface device does not exhibit constant haptic behavior).

In the system shown in FIG. 1B, a haptic interface device that is not constrained by constant haptic behavior (a reconfigurable haptic interface device) is enabled by providing multiple haptic models. There are limitations to such an approach. It may be expensive to develop, construct and/or maintain multiple haptic models. It may be difficult to establish compatibility between each of multiple haptic models and other components of the haptic interface device. It may be difficult or impossible to select a new haptic model during use of the haptic interface device by the user. Even if it is possible for the user to select a new haptic model during use of the haptic interface device, switching from one haptic model to another will result in a discontinuity in the haptic display that may be disconcerting to the user.

It is desirable to provide a haptic interface that is not constrained by constant haptic behavior and that eliminates or ameliorates one or more of the above-indicated limitations.

SUMMARY OF THE INVENTION

According to the invention, a user can selectively engage at least part of the haptic display of a haptic interface device to produce an enhanced interaction with an environment with which the user interacts using the haptic interface device. Further, the invention can be implemented so that the part of the haptic display that is engaged can be engaged to varying degree. The degree of engagement of the haptic display (together with whether part or all of the haptic display is engaged) determines the manner in which the haptic display is experienced by the user. The selective engagement with the haptic display is enabled by adding a haptic clutch model to the underlying haptic model used to produce the haptic display, the haptic clutch model engaging some part or all of the haptic model in response to user input. The addition of a haptic clutch model to the haptic model used to produce a haptic display provides a richer user interaction than is provided by a haptic display produced by the haptic model alone. The addition of a haptic clutch model particularly enhances the user interaction enabled by low degree of freedom haptic interface devices, since the addition of the haptic clutch model creates the perception in a user of interaction with a more powerful, versatile and complex haptic display than that produced by such haptic interface device without the haptic clutch model. This can enable the production of a haptic interface device providing a particular richness of interaction with a simpler and cheaper construction than would otherwise be the case.

In one embodiment of the invention, a haptic interface device includes: i) means for providing a haptic sensation to a user in response to an interaction with an environment by the user; ii) means for receiving an input from a user; and iii) means for selectively engaging the means for providing a haptic sensation in response to the user input.

In another embodiment of the invention, a haptic interface device includes: i) means for receiving a first input from a user, the first input producing a corresponding interaction with an environment by the user; ii) means for providing a haptic sensation to the user in response to the interaction with the environment by the user; iii) means for receiving a second input from a user, the second input being different from the first input; and iv) means for selectively engaging the means for providing a haptic sensation in response to the second user input.

In yet another embodiment of the invention, a method for providing a haptic interface to an environment, comprises the steps of: monitoring an environment interaction control apparatus to identify whether a first input has been received from a user, receipt of the first input producing a corresponding interaction with the environment by the user; ii) monitoring a clutch control apparatus to identify whether a second input has been received from the user, the second input being different from the first input; and iii) selectively providing, in response to the monitoring of the clutch control apparatus to identify whether a second input has been received from the user, a haptic sensation to the user in response to the interaction with the environment by the user.

DETAILED DESCRIPTION OF THE INVENTION

Figure 2:
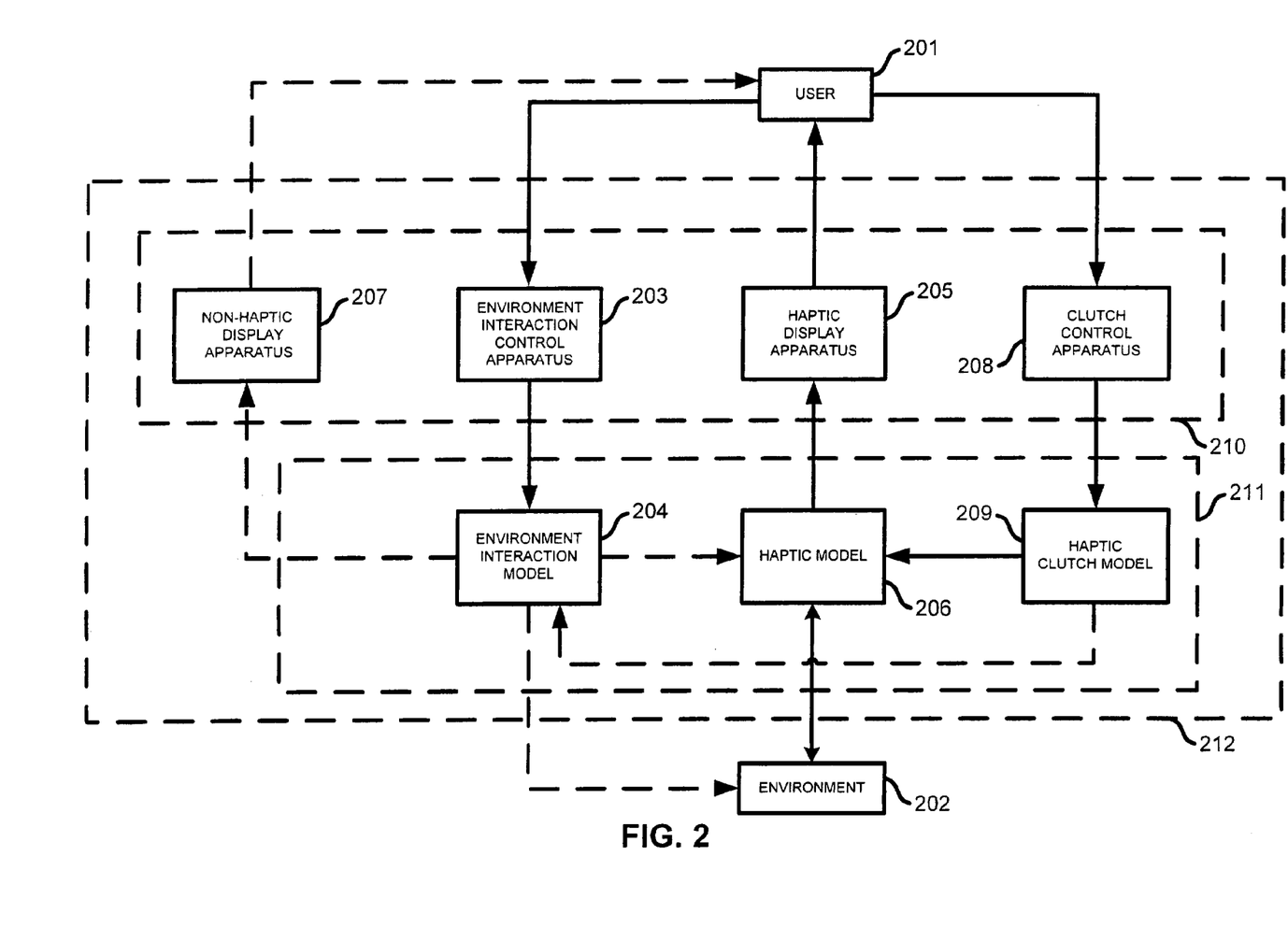
FIG. 2 is a block diagram illustrating the functional components of a haptic interface device according to the invention.

FIG. 2 is a block diagram illustrating the functional components of a haptic interface device 212 according to the invention. A user 201 interacts with an environment 202 using the haptic interface device 212. (What can constitute the environment 202 and the types of interaction that the user 201 can have with the environment 202—which typically will depend upon the nature of the environment 202—are discussed further below.) The haptic interface device 212 includes user input/output apparatus 210 and user interaction model 211.

The user input/output apparatus 210 is tangible apparatus with which the user 201 can physically interact (e.g., using the sense of touch, sight, hearing, smell and/or taste) to provide input to the haptic interface device 212. The user input/output apparatus 210 includes an environment interaction control apparatus 203, a haptic display apparatus 205 and a clutch control apparatus 208. The user input/output apparatus 210 can also, but need not necessarily (as indicated by the dashed lines between the non-haptic display apparatus 207 and the environment interaction model 204 and user 201), include a non-haptic display apparatus 207. It is to be understood, as discussed further below, that two or more of the environment interaction control apparatus 203, haptic display apparatus 205, clutch control apparatus 208 and non-haptic display apparatus 207 can be embodied in the same device. The environment interaction control apparatus 203, haptic display apparatus 205, clutch control apparatus 208 and non-haptic display apparatus 207 are separately illustrated in the drawings and discussed herein to clearly identify, and facilitate discussion of, the different functional components of the user input/output apparatus 210.

The user interaction model 211 "translates" user input to, and output from, the environment 202. The user 201 cannot interact directly with the user interaction model 211. Often, the user interaction model 211 is embodied by one or more computer programs executing on a computational device. (However, the user interaction model 211 can be embodied in other ways, e.g., tangible physical apparatus such as mechanical linkages.) The user interaction model 211 includes an environment interaction model 204, a haptic model 206 and a haptic clutch model 209. It is to be understood, as more readily apparent from the description below, that one or more of the environment interaction model 204, haptic model 206 and haptic clutch model 209 can be embodied in the same physical apparatus or as part of the same computer program. The environment interaction model 204, haptic model 206 and haptic clutch model 209 are separately illustrated in the drawings and discussed herein to clearly identify, and facilitate discussion of, the different functional components of the user interaction model 211.

The haptic interface device 212 is used and operates as follows. A user 201 engages in an input interaction (e.g., browsing, editing, manipulating, controlling, annotating, marking, navigating, deforming, arranging) with the environment 202 using the environment interaction control apparatus 203. The nature of the input interaction with the environment 202 is determined in accordance with the environment interaction model 204. (The environment interaction model 204 can communicate input from the user 201 to the environment 202 either directly or via the haptic model 206, as indicated in FIG. 2 by the dashed line between the environment interaction model 204 and the environment 202, and the dashed line between the environment interaction model 204 and the haptic model 206.) Based on the interaction by the user 201 with the environment 202, a haptic display (which may or may not be provided to the user 201 via the haptic display apparatus 205, as described further below) is produced in accordance with the haptic model 206. (The haptic model 206 can produce the haptic display based on information concerning the user interaction obtained either from the environment interaction model 204 or the environment 202, as indicated in FIG. 2 by the dashed line between the environment interaction model 204 and the haptic model 206 and the dashed arrow head entering the haptic model 206 from the environment 202.) If present, the non-haptic display apparatus 207 can also produce a non-haptic display (e.g., a visual display and/or an audio display) based on the user interaction with the environment 202. The user 201 can use the clutch control apparatus 208 to provide input to the haptic clutch model 209. In response to appropriate user input, the haptic clutch model 209 "engages" at least part of the haptic model 206 (i.e., causes at least part of the haptic display to be perceived by the user 201 via the haptic display apparatus 205) to a degree that is determined by the user input. (Of course, the haptic clutch model 209 may engage all of the haptic model 206, depending upon the implementation of the haptic interface device 212 and/or the input from the user 201.) The invention can—and, it is anticipated, typically will—be implemented so that, in addition to controlling engagement of the haptic clutch model 209 with the haptic model 206, user input to the clutch control apparatus 208 also controls engagement of the environment interaction model 204 with the environment 202 or haptic model 206, as appropriate for the particular implementation of the invention. (However, as indicated in FIG. 2 by the dashed line between the haptic clutch model 209 and the environment interaction model 204, this need not necessarily be the case.) The degree of engagement of the haptic clutch model 209 with the haptic model 206 (together with whether part or all of the haptic model 206 is engaged) determines the manner in which the haptic sensation produced by the haptic model 206 is experienced by the user 201.

The addition of the haptic clutch model 209 to the haptic model 206 used to produce a haptic display provides a richer user interaction than is provided if the haptic display is produced by the haptic model 206 alone. The addition of the haptic clutch model particularly enhances the user interaction enabled by low degree of freedom haptic interface devices, since the addition of the haptic clutch model creates the perception in a user of interaction with a more powerful, versatile and complex haptic display than that produced by such haptic interface device without the haptic clutch model. For example, the haptic clutch model 209 enables discontinuous provision of the haptic display to the user 201, which can enable the user 201 greater flexibility in interacting with the environment 202, as will be more readily apparent from the description of particular embodiments of the invention below. The haptic clutch model 209 can also enable simulation of degrees of freedom of user interaction in addition to those simulated by the haptic model 206. Thus, the invention can enable the production of a haptic interface device providing a particular richness of interaction with a simpler and cheaper construction than would otherwise be the case.

As used herein, "environment" refers generally to anything that can be perceived by a user and with which the user can interact in a manner that enables a haptic sensation to be provided to the user to represent the state of one or more aspects of the environment. An environment can be embodied by an apparatus and/or a representation (e.g., an image, sound or smell)produced by an apparatus (e.g., a computational device operating in accordance with one or more computer programs). For example, an environment can be a visual and/or an audio recording, a spreadsheet, a still photographic image, a graphic representation of object(s) or scenes(s) by a computational device and associated display device (e.g., a map, a video game, a graphic representation of a molecular structure, a graphic representation of a mechanical linkage), a vehicle control system (e.g., a passenger compartment climate control system), a home appliance (e.g., oven, telephone, toaster, radio, stereo, lights, television), or an industrial tool (e.g., factory machines, nuclear power plant components). The foregoing list gives an indication of the wide variety of apparatus and representations that can constitute an "environment," and the variety of applications with which a haptic display device in accordance with the invention can be used.

The environment interaction model 204 relates the state of one or more user inputs to the environment interaction control apparatus 203 to the state of the environment 202. The environment interaction model 204 is typically embodied by software and/or firmware that represents one or more mathematical relationships that produce the desired environment interaction control capability. Those skilled in the art can implement an environment interaction model 204 for a particular environment 202, environment interaction control apparatus 203 and specified inputs to and outputs from the environment interaction model 204, as described elsewhere herein.

Environment interaction control (i.e., input to the environment interaction model 204) can be effected in any appropriate manner, such as, for example, by sensing force or pressure applied to the environment interaction control apparatus 203, touching of a surface of the environment interaction control apparatus 203, position (or higher order derivatives thereof, such as velocity, acceleration and jerk) of some part or all of the environment interaction control apparatus 203, sound (e.g., sound volume, spoken instruction) emitted by the user 201 or an audio device, movement of a part of the body (e.g., facial or arm movements) of the user 201, or some combination of such inputs. A variety of conventional devices (e.g., sensors and, if applicable, associated processing devices) can be used for this purpose. Since it is anticipated that the invention will often be implemented in relatively small apparatus, it is desirable that the environment interaction control sensor(s) be relatively small devices (e.g., strain gauge(s), force sensitive resistor(s), Hall-effect sensor(s), optical displacement sensor(s)).

The output from the environment interaction model 204 establishes the state of the environment 202. For example, when the environment 202 is a visual and/or an audio recording, the environment interaction model 204 identifies a frame of the visual recording and/or audio sample(s) of the audio recording that correspond to the user input to the environment interaction control apparatus 203. The changes in the environment 202 that result from changes in user input to the environment interaction control apparatus 203 will typically depend upon the nature of the environment 202. For example, the user 201 could use the environment interaction control apparatus 203 to move through the frames of a visual and/or audio recording. Or, for example, the user 201 could use the environment interaction control apparatus 203 to change temperature in the passenger compartment of a vehicle. The user 201 could use the environment interaction control apparatus 203 to move control rods in a nuclear reactor. Or, the user 201 could use the environment interaction control apparatus 203 to change the volume of a radio or stereo. Other possibilities are readily apparent from the description of the invention elsewhere herein (e.g., examples of an "environment").

Depending upon the nature of the environment 202 and the implementation of the haptic interface 212, the output from the environment interaction model 204 can also cause the production of a non-haptic display by the non-haptic display apparatus 207. For example, when the environment 202 is a visual and/or an audio recording, the non-haptic display apparatus 207 can display frame (s) of the visual recording and/or audio sample(s) of the audio recording. If the environment 202 is a climate control system for a vehicle passenger compartment, the non-haptic display apparatus can display a temperature setting for the passenger compartment. If the environment 202 is the control rods in a nuclear reactor, the non-haptic display apparatus can display the position of the control rods.

The haptic model 206 relates the state of one or more aspects of the environment 202 to output (haptic sensation) produced by the haptic display apparatus 205. The haptic model 206 is typically embodied by software and/or firmware that represents one or more mathematical relationships that produce the desired haptic display. Those skilled in the art can implement a haptic model 206 for a particular environment 202, haptic display apparatus 205 and specified inputs to and outputs from the haptic model 206, as described elsewhere herein.

Though, in FIG. 2, a single haptic model 206 is depicted, it is to be understood that a haptic interface device according to the invention (or a system including a haptic interface device according to the invention) can be implemented with multiple haptic models (as in FIG. 1B, described above). The invention can be implemented so that selection of which haptic model is used to produce a haptic display at any particular time is made by the user or occurs automatically in accordance with one or more predetermined criteria concerning operation of the haptic interface device or system. Additionally, the invention can be implemented so that at least part of one, some or all of the haptic models can be selectively engaged in response to appropriate user input (and, depending upon the implementation, to a degree that is determined by the user input).

The aspect(s) of the environment 202 on which the haptic output depends (i.e., the input to the haptic model 206) can—and often will—depend on the nature of the environment 202. For example, if the environment 202 is a visual and/or an audio recording, the input to the haptic model 206 can relate to which part of the recording is currently being displayed (e.g., whether a video frame is being displayed or a transition between video frames is occurring). Or, for example, if the environment 202 is a spreadsheet, the input to the haptic model 206 can be the value(s) of quantit(ies) in the spreadsheet. If the environment 202 is an automobile climate control system, the input to the haptic model 206 can be the temperature setting for the passenger compartment of a vehicle. Or, if the environment 202 is a radio or stereo, the input to the haptic model 206 can be the volume setting for the radio or stereo.

Output produced by the haptic display apparatus 205 can include, for example, sensations of texture, force (e.g., frictional force, magnetic repulsion or attraction), vibration, mass, density, viscosity, temperature, moisture, or some combination of such sensations. When the environment 202 is a visual and/or an audio recording, for example, force can be applied in opposition to movement of an apparatus embodying the environment interaction control apparatus 203 and the haptic display apparatus 205 to simulate a detent as transition is made from one video frame to the next. Additionally, as known to those skilled in the art, the haptic model 206 can replicate a variety of characteristics of a haptic sensation, such as inertia, damping and/or compliance. The haptic display apparatus 205 can make use of a variety of devices to produce the haptic display. For example, if appropriate for the desired haptic display, devices for producing force and/or vibrotactile sensation can be used, such as, for example, DC servo motor(s), voice coil motor(s), linear actuator(s), hydraulic actuator(s), pneumatic actuator(s), shape memory alloy(s) (SMAs) and piezoelectric transducer(s). If appropriate for the desired haptic display, thermal devices can additionally or alternatively be used, such as, for example, thermoelectric module(s), or heater and fan combination(s). If appropriate for the desired haptic display, moisture devices and/or materials can additionally or alternatively be used, such as, for example, condenser(s), mister(s), moisture-permeable barrier(s) and anhydrous material(s).

As indicated above, the haptic clutch model 209 engages at least part of the haptic model 206 in accordance with user input to the clutch control apparatus 208. Like the haptic model 206, the haptic clutch model 209 typically is embodied by software and/or firmware that represents one or more mathematical relationships that produce the desired haptic display. An example of a haptic clutch model 209 is described in more detail below with respect to FIGS. 4A, 4B and 4C.

Clutch control (i.e., input to the haptic clutch model 209) can be effected in any appropriate manner, such as, for example, by sensing force or pressure applied to the clutch control apparatus 208, touching of a surface of the clutch control apparatus 208, position (or higher order derivatives thereof, such as velocity, acceleration and jerk) of some part or all of the clutch control apparatus 208, sound (e.g., sound volume, spoken instruction) emitted by the user 201 or an audio device, movement of a part of the body (e.g., facial or arm movements) of the user 201, or some combination of such inputs. A variety of conventional devices (e.g., sensors and, if applicable, associated processing devices) can be used for this purpose. Since it is anticipated that the invention will often be implemented in relatively small apparatus, it is desirable that the clutch control sensor(s) be relatively small devices (e.g., strain gauge(s), force sensitive resistor(s), Hall-effect sensor(s), optical displacement sensor(s)).

Figure 3A:
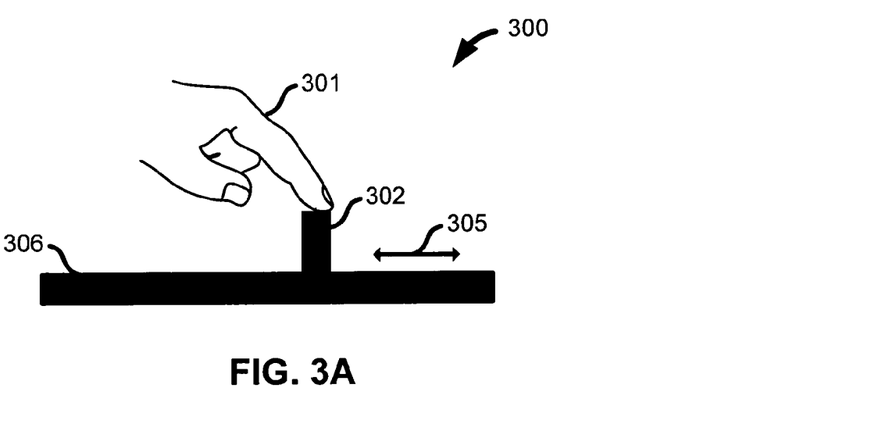
FIG. 3A is a simplified side view of a haptic interface device according to an embodiment of the invention.
Figure 3B:
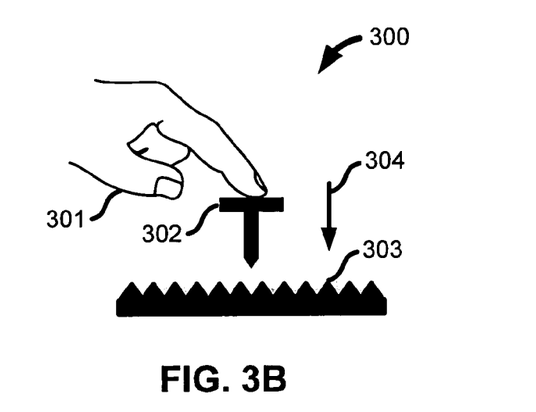
FIGS. 3B and 3C are an illustration of a virtual representation of the haptic interface device of FIG. 3A, illustrating operation of the functional components of the haptic interface device.
Figure 4A:
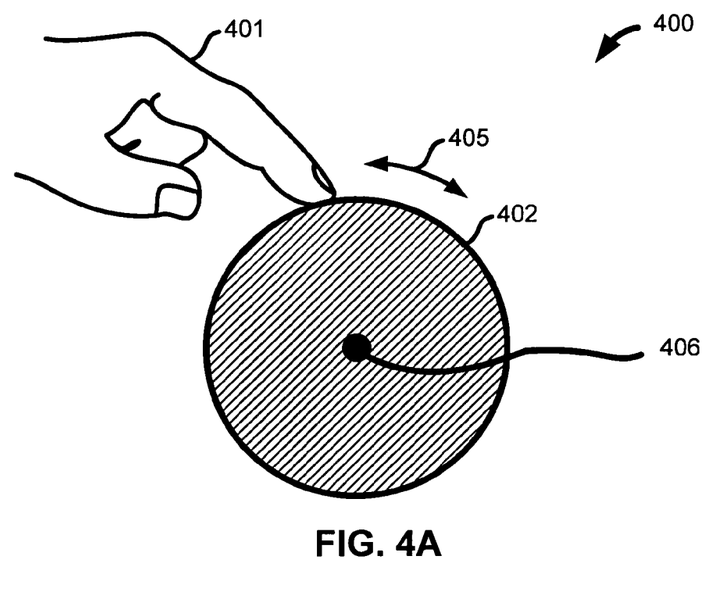
FIG. 4A is a simplified side view of a haptic interface device according to another embodiment of the invention.
Figure 4B:
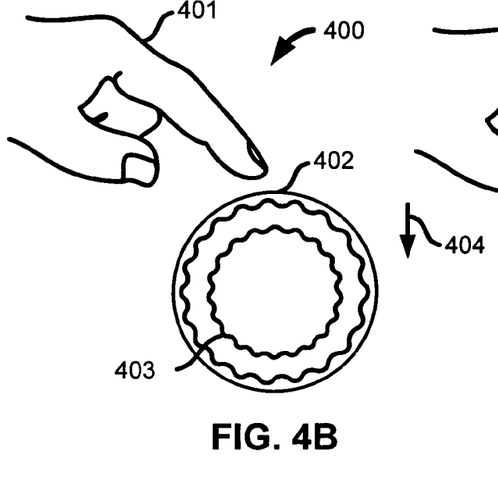
FIGS. 4B and 4C are an illustration of a virtual representation of the haptic interface device of FIG. 4A, illustrating operation of the functional components of the haptic interface device.
Figure 4C:
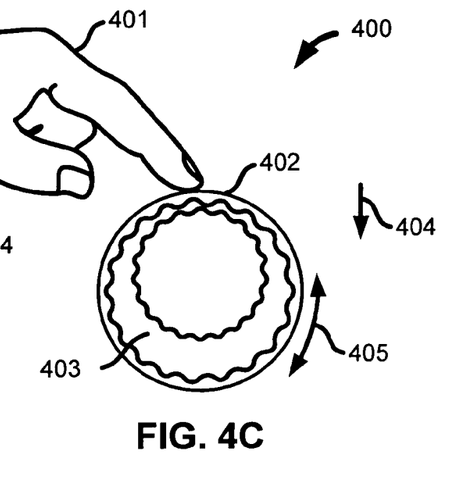

In some embodiments of the invention, clutch control and environment interaction control are effected (at least in part) by sensing force and/or position (or higher order derivatives), and the haptic display is effected (at least in part) by providing a force. In such embodiments, it can be desirable to sense the clutch control input along an axis that is different from (e.g., orthogonal to) that along which the environment interaction control input is sensed and/or the haptic display output is provided, so that the user 201 perceives interaction with a haptic interface device having an additional degree of freedom. (This is shown in FIGS. 3A and 3B, described below, in which clutch control is effected by moving the user control device 302 in the direction of the arrow 304, which is substantially perpendicular to the axis 305 along which environment control is effected and haptic display is provided. This is also shown in FIGS. 4A, 4B and 4C, also described below, in which clutch control is effected by moving the user control device 402 in the direction of the arrow 404, which is substantially orthogonal to the rotational axis 405 along which environment control is effected and haptic display is provided.) This is desirable, in particular, because the additional degree of freedom is provided using an input device (sensor) rather than an output device (actuator), the latter typically being more expensive than the former.

Provision of a haptic display (and, if the invention is so implemented, which part(s) of the haptic display and/or the degree of provision of the haptic display or part(s) of the haptic display) to the user 201 depends upon engagement of the haptic clutch model 209 with the haptic model 206. As indicated above, a system in accordance with the invention can also be implemented so that use of (i.e., engagement of) the environment interaction control apparatus 203 (and, if present, the non-haptic display 207) also depends upon engagement of the haptic clutch model 209 with the haptic model 206. FIGS. 3A, 3B, 3C, 4A, 4B, 4C and 5 (discussed below) illustrate examples of such embodiments.

The environment interaction control apparatus 203, the haptic display apparatus 205, the clutch control apparatus 208 and the non-haptic display apparatus 207 can be embodied by any appropriate device or devices (e.g., devices that sense the exemplary inputs to, or produce the exemplary outputs from, the corresponding models, discussed above), a variety of which are known to those skilled in the art. For example, the clutch control apparatus 208 can be embodied by a squeezable bulb or handle, a force or motion-sensitive handle or arm, a capacitive touch sensing device, or a speech recognition system. The environment interaction control apparatus 203 can be embodied by, for example, a rotatable wheel or knob, a force or motion-sensitive handle or arm, a speech recognition system, or a computer-vision system that monitors head or eye movement. The haptic display apparatus 205 can be embodied by, for example, a force-actuated wheel, knob, handle or arm, a heat sourcing and/or sinking device, or a moisture generating and/or absorbing device. The non-haptic display apparatus 207 can be embodied by, for example, a computer display device, a television, a stereo or a radio. The foregoing are intended only to be illustrative; there are many other devices that can be used to embody the environment interaction control apparatus 203, the haptic display apparatus 205, the clutch control apparatus 208 and the non-haptic display device 207.

It may be necessary or desirable for two or more of the environment interaction control apparatus 203, the haptic display apparatus 205, the clutch control apparatus 208 and the non-haptic display apparatus 207 to be embodied in the same device. (However, this need not be the case; in fact, multiple devices can be used to implement any one of the environment interaction control apparatus 203, the haptic display apparatus 205, the clutch control apparatus 208 or the non-haptic display apparatus 207.) FIGS. 3A, 3B, 3C, 4A, 4B, 4C and 5 (discussed below) illustrate embodiments of a haptic interface device in accordance with the invention in which all three of the environment interaction control apparatus 203, the haptic display apparatus 205, and the clutch control apparatus 208 are embodied in the same device. A Phantom™ device (known to those skilled in the art of haptic interface devices), modified to include haptic clutching in accordance with the invention, is another example of a single device that can embody the environment interaction control apparatus 203, the haptic display apparatus 205, and the clutch control apparatus 208 of a haptic interface device according to the invention.

Figure 3C:
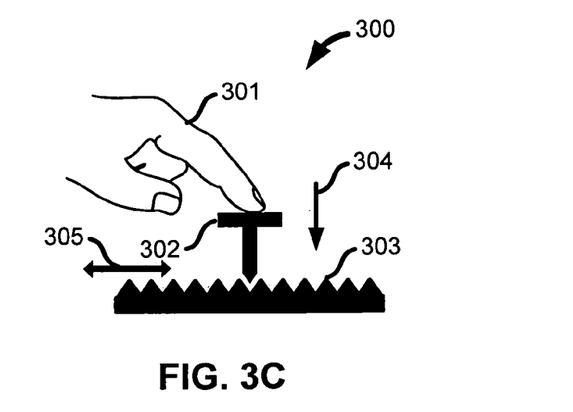

FIG. 3A is a simplified side view of a haptic interface device 300 according to an embodiment of the invention. FIGS. 3B and 3C are an illustration of a virtual representation of the haptic interface device 300, illustrating operation of the functional components of the haptic interface device 300. In the embodiment illustrated in FIGS. 3A and 3B, both environment interaction control and clutch control are effected using a single degree of freedom translational input, and haptic display is produced using a single degree of freedom translational output.

As shown in FIG. 3A, a user control device 302 is positioned within a slot (not visible in FIG. 3A) of a base 306. (The illustration of the user control device 302 in FIG. 3A represents a physical device, while the illustration of the user control device 302 in FIGS. 3B and 3C does not represent a physical device, but, rather, a virtual representation of a physical device.) The user control device 302 can be moved with respect to the base 306 back and forth along an axis 305 (represented by the arrows in FIGS. 3A and 3C. As explained Further below, movement of the user control device 302 along the axis 305 can effect corresponding changes in an environment with which the user control device 302 enables the user 301 to interact.

A haptic model is implemented to produce a haptic display that simulates (i.e. produces a virtual representation of) a textured (e.g., rough, toothed, bumpy, ridged, striated) surface 303 (FIGS. 3B and 3C). A virtual representation of a textured surface can be produced, as known to those skilled in the art, by selectively (e.g., periodically) applying a force, in a direction substantially parallel to the (virtual) plane of the textured surface, to an object to which the sensation of moving over a textured surface is to be imparted. A Pencat™ device, a two-dimensional stylus known to those skilled in the art of haptic interface devices, is an example of a haptic interface device in which such simulation of a textured surface has been implemented.

In FIG. 3B, the user 301 is shown imparting a translational force and/or motion to the user control device 302 in the direction of the arrow 304 (FIG. 3B). The user control device 302 includes one or more devices for measuring the translational force and/or motion. A haptic clutch model simulates increasing engagement of the virtual representation of the user control device 302 with the virtual representation of the textured surface 303 as the measured translational force and/or motion increases in the direction of the arrow 304.

When the virtual representation of the user control device 302 is sufficiently engaged with the virtual representation of the textured surface 303, as determined in accordance with the haptic clutch model, movement of the user control device 302 along the axis 305 (which is substantially perpendicular to the arrow 304) causes the virtual representation of the textured surface 303 to move together with the virtual representation of the user control device 302 along the axis 305. Movement of the virtual representation of the textured surface 303 effects corresponding changes in the environment with which the user control device 302 enables the user 301 to interact. Prior to such degree of engagement, but after the virtual representation of the user control device 302 begins to engage the virtual representation of the textured surface 303, movement of the user control device 302 along the axis 305 causes the user 301 to feel the sensation of the user control device 302 moving over the textured surface 303.

When translational force and/or motion is applied to the user control device 302 in a direction opposite to the direction of the arrow 304, the virtual representation of the user control device 302 is gradually disengaged from the virtual representation of the textured surface 303, in accordance with the haptic clutch model, until the virtual representation of the user control device 302 is sufficiently disengaged so that the virtual representation of the textured surface 303 no longer moves in tandem with the virtual representation of the user control device 302. If the user input to the user control device 302 is force only, then removal of the application of force to the user control device 302 by the user 301 causes disengagement of the virtual representation of the user control device 302 from the virtual representation of the textured surface 303. If the user input to the user control device 302 includes motion, then the haptic interface device can be implemented so that movement of the user control device 302 in a direction opposite to the direction of the arrow 304 can occur either as a result of the user pushing or pulling the user control device 301 in that direction, or because the user control device 302 is spring-loaded to return to a disengaged state when the user 301 discontinues contact with the user control device 302.

If the haptic model is implemented so that, once started in motion, the virtual representation of the textured surface 303 continues to move even after disengagement of the virtual representation of the user control device 302 (e.g., because the haptic model includes modeling of inertia of the textured surface 303), then, as the virtual representation of the user control device 302 gradually disengages from the virtual representation of the textured surface 303, the user 301 feels the sensation of the textured surface 303 moving under the user control device 302. Eventually, the virtual representation of the user control device 302 completely disengages from the virtual representation of the textured surface 303 so that the user 301 doesn't feel the textured surface 303 at all. Imparting a force and/or motion to the user control device 302 back in the direction of the arrow 304 eventually causes the user 301 to again feel the sensation of the user control device 302 moving over the textured surface 303. If sufficient force and/or motion is imparted to the user control device 302 in the direction of the arrow 304, the virtual representation of the user control device 302 can engage the virtual representation of the textured surface 303 so that movement of the virtual representation of the textured surface 303 is stopped. (The haptic model can also be implemented so that, as relative motion between the virtual representation of the user control device 302 and the virtual representation of the textured surface 303 occurs, "friction" between the virtual representation of the user control device 302 and the virtual representation of the textured surface 303 eventually causes motion of the virtual representation of the textured surface 303 to stop.)

FIG. 4A is a simplified side view of a haptic interface device 400 according to another embodiment of the invention. FIGS. 4B and 4C are an illustration of a virtual representation of the haptic interface device 400, illustrating operation of the functional components of the haptic interface device 400. The haptic interface device illustrated in FIGS. 4A, 4B and 4C is similar to that illustrated in FIGS. 3A, 3B and 3C. However, in the haptic interface device illustrated in FIGS. 4A, 4B and 4C, while clutch control is effected using a single degree of freedom translational input (like the haptic interface device illustrated in FIGS. 3A, 3B and 3C), environment interaction control is effected using a single degree of freedom rotational input (unlike the haptic interface device illustrated in FIGS. 3A, 3B and 3C). The haptic display can be produced using a single degree of freedom translational or rotational output.

As shown in FIG. 4A, a user control device 402 is attached to, and rotates with, a shaft 406. (The illustration of the user control device 402 in FIG. 4A represents a physical device, while the illustration of the user control device 402 in FIGS. 4B and 4c does not represent a physical device, but, rather, a virtual representation of a physical device.) The user control device 402 can be rotated back and forth along a rotational axis 405 (represented by the arrows in FIG. 4A, 4C. As explained further below, movement of the user control device 402 along the rotational axis 405 can effect corresponding changes in an environment with which the user control device 402 enables the user 401 to interact.

A haptic model is implemented to produce a haptic display that simulates (i.e., produces a virtual representation of) a textured surface 403 (FIGS. 4B and 4C). In FIG. 4B, the user 401 is shown imparting a translational force and/or motion to the user control device 402 in the direction of the arrow 404 (FIG. 4B), which force and/or motion is measured by the user control device 402. A haptic clutch model simulates increasing engagement of the virtual representation of the user control device 402 (which is also modeled to be a textured surface) with the virtual representation of the textured surface 403 as the measured translational force and/or motion increases in the direction of the arrow 404. When the virtual representation of the user control device 402 is sufficiently engaged with the virtual representation of the textured surface 403, rotation of the user control device 402 along the rotational axis 405 causes the virtual representation of the textured surface 403 to rotate together with the virtual representation of the user control device 402 along the axis 405, thereby effecting corresponding changes in the environment with which the user control device 402 enables the user 401 to interact. The user 401 can interact (move and/or apply force) with the user control device 402 to gradually disengage and engage the virtual representation of the user control device 402 from the virtual representation of the textured surface 403, the degree of engagement determining whether the user 401 feels the sensation of the user control device 402 moving over the textured surface 403, motion of the virtual representation of the textured surface 403 relative to the virtual representation of the user control device 402 is stopped, or the virtual representation of the user control device 402 does not contact the virtual representation of the textured surface 403 at all.

The haptic clutch model and haptic model for a haptic interface device as in FIGS. 4A, 4B and 4C can be implemented by the following equations:

$$F_{clutch} = f_1 * h * \sin(x_0 - x_i) \quad (1)$$

$$0 = (M_i * a_i) - F_{clutch} \quad (2)$$

$$F_{act} = (B_o * v_o) - F_{clutch} \quad (3)$$

where $F_{clutch}$ is the force transmitted between the virtual representation of the user control device 402 and the virtual representation of the textured surface 403, $f_1$ is the clutch control force (perhaps amplified or otherwise conditioned) applied to the user control device 402 by the user 401, h is a dimensionless constant indicating the height of the bumps on the virtual representations of the user control device 402 and textured surface 403, $x_0$ is the measured position of the user control device 402 (converted to a translational position of the virtual representation of the user control device 402 from the rotational position of the actual user control device 402), $x_i$ is the position of the virtual representation of the textured surface 403, $a_i$ is the acceleration of the virtual representation of the textured surface 403, $v_o$ is the velocity of the user control device 402 (converted to a translational velocity of the virtual representation of the user control device 402 from the angular velocity of the actual user control device 402) $M_i$ is the modeled mass of the virtual representation of the textured surface 403, $B_o$ is the damping associated with the user control device 402, and $F_{act}$ is the force applied in opposition to rotation of the user control device 402 to simulate the textured surface 403 and the textured surface on the virtual representation of the user control device 402. For simplicity, equations (1)–(3) above model translational position and force, rather than rotational position and force.

A haptic interface device as illustrated in FIGS. 4A, 4B and 4C can be used, for example, to enable browsing through, and/or editing of, a visual recording. (The haptic interface device illustrated in FIGS. 3A and 3B can also be used for such an application, though the haptic interface device of FIGS. 4A, 4B and 4C may be preferable for the reason discussed below.) The user 401 can move back and forth through the visual recording by engaging the virtual representation of the user control device 402 with the virtual representation of the textured surface 403 and rotating the user control device 402 along the axis 405. If the user 401 maintains engagement of the virtual representation of the user control device 402 with the virtual representation of the textured surface 403, movement through the visual recording stops when the user 401 stops rotating the user control device 402. If the user 401 disengages the virtual representation of the user control device 402 from the virtual representation of the textured surface 403 after beginning movement through the visual recording, the virtual representation of the textured surface 403 continues to rotate and, thus, movement through the visual recording continues. If the user 401 then desires to stop movement through the visual recording, the user 401 re-engages the virtual representation of the user control device 402 with the virtual representation of the textured surface 403. The user 401 can control the speed of rotation of the user control device 402 to control the speed with which the user 401 moves through the visual recording.

Though the user control device 402 is described above as a cylindrical-shaped device attached to a shaft, with appropriate modification to the above description, as understood by those skilled in the art, the user control device 402 can be a spherical device mounted on a spherical bearing.

In principle, the haptic interface device illustrated in FIGS. 4A, 4B and 4C is very similar to the haptic interface device illustrated in FIGS. 3A and 3B: in both haptic interface devices, a user control device can be used to engage a virtual representation of a textured surface which, at the point of engagement with a virtual representation of the user control device, can move relative to the virtual representation of the user control device in a direction perpendicular to that in which clutch activation occurs. However, for some applications (e.g., browsing and/or editing a visual and/or audio recording), the haptic interface device illustrated in FIGS. 4A, 4B and 4C can be preferable to the haptic interface device illustrated in FIGS. 3A and 3B because the extent of motion of the user control device of the former is not constrained (i.e., the user control device 402 can be rotated indefinitely), while the latter is (i.e., there must be limits to movement of the user control device 302 within the slot 306). Additionally, a "rotational" haptic interface device as illustrated in FIGS. 4A, 4B and 4C can be less expensive to construct than a "translational" haptic interface device as illustrated in FIGS. 3A and 3B. On the other hand, for some applications, a "translational" haptic interface device as illustrated in FIGS. 3A and 3B may be more appropriate because of the nature of the environment with which the haptic interface device is used or because of the nature of the user interaction model.

In the haptic interface devices illustrated in FIGS. 3A, 3B, 3C, 4A, 4B and 4C, the haptic model simulates a textured surface. However, this need not necessarily be the case: a haptic interface device in accordance with the invention can also be implemented so that the haptic clutch model engages with a smooth surface. Such a haptic interface device may be desirable when the environment with which the haptic interface device enables the user to interact does not include discrete elements (e.g., video frames of a visual recording, or columns and rows in a spreadsheet), but, rather, is continuous in nature (e.g., the brightness of a lighting system or the volume of an audio system). Additionally, for some environments, it may be desirable for the haptic model to simulate a textured surface or smooth surface depending on one or more aspects of the environment. For example, when the environment is a video recording, it may be desirable for the haptic model to simulate a textured surface when the video frame rate is below that at which the human eye can no longer perceive individual video frames (e.g., less than about 24 frames per second), i.e., when the environment appears to the user to include discrete elements, and to simulate a smooth surface when the video frame rate is above such rate i.e., when the environment appears to the user to be continuous.

Figure 5:
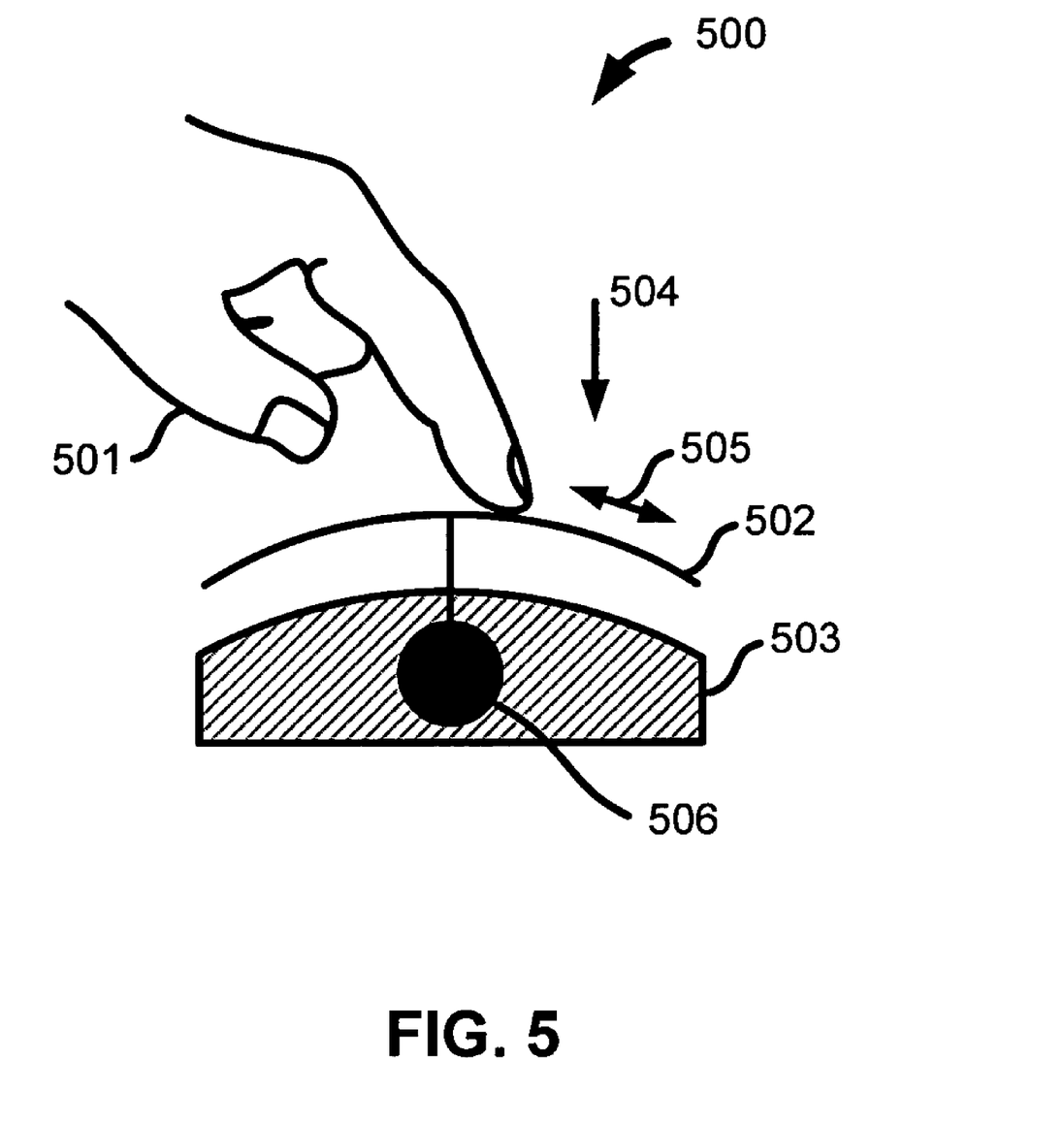
FIG. 5 is a simplified side view of a haptic interface device according to still another embodiment of the invention.

FIG. 5 is a simplified side view of a haptic interface device 500 according to still another embodiment of the invention. A user control device 502 is attached to, and rotates with, a shaft 506 that is mounted on a base 503. A user 501 can rotate the user control device 502 back and forth along a rotational axis 505, which movement can effect corresponding changes in an environment with which the user control device 502 enables the user 501 to interact. Generally, the haptic interface device 500 can be constructed and operated in a manner similar to that described above for the haptic interface device 400 (FIGS. 4A, 4B and 4C). However, since the user control device 502 cannot be rotated beyond the surface on which the base 503 is positioned, the movement of the user control device 502 along the axis 505 is constrained. This may be acceptable in applications of the invention in which it is not necessary to enable a wide range of movement of the user control device 502 to effect the desired range of environment control. Constraining the movement of the user control device 502 enables a smaller (and cheaper) apparatus to be used to produce the haptic display. For example, as understood by those skilled in the art, if the user control device 502 is implemented to rotate along the rotational axis 505 within a relatively small angular range, a relatively small (and inexpensive) rotary motor can be used with appropriate gearing to provide to the haptic display apparatus an amount of power (and, thus, a haptic display of comparable quality and/or magnitude) substantially equal to that provided by a larger (and more expensive) motor used to provide power to a user control device 502 that is allowed to rotate over a larger angular range. (The user control device 502 can also be implemented to enable translational movement of the user control device 502.) Additionally, the haptic interface device illustrated in FIG. 5 can be made more compact (and therefore constructed more cheaply) than the haptic interface device illustrated in FIGS. 4A, 4B and 4C, since the user control device 502 is only part of a cylinder (or sphere), unlike the user control device 402 of the haptic interface device illustrated in FIGS. 4A, 4B and 4C.

In the embodiments of the invention described above with respect to FIGS. 3A, 3B, 3C, 4A, 4B, 4C and 5, clutch control is effected using a translational input (e.g., position and/or force). However, in other embodiments of the invention, clutch control can be effected using a rotational input (e.g., position and/or force).

Further, in the embodiments of the invention described above with respect to FIGS. 3A, 3B, 3C, 4A, 4B, 4C and 5, environment interaction control and clutch control are effected using rotational or translational input, and haptic display is produced using rotational or translational output. In other embodiments of the invention, in which input and output are effected other than through sensing force or position, such control and display can be effected other than by rotational or translational input or output.

Additionally, in the embodiments of the invention described above with respect to FIGS. 3A, 3B, 3C, 4A, 4B, 4C and 5, environment interaction control and clutch control are effected by a single degree of freedom input, and haptic display is effected by a single degree of freedom output. However, generally, environment interaction control, clutch control and haptic display can be effected by an input or output (as appropriate) having any number of degrees of freedom (e.g., an input or output along one or more of three orthogonal translational axes and/or one or more of three rotational axes). Further, generally, each of the environment interaction control, clutch control and haptic display can be effected using an input or output (as appropriate) having a number of degrees of freedom that is the same as, or different than, the number of degrees of freedom of the input or output (as appropriate) with which one or both of the other of the environment interaction control, clutch control and haptic display are effected.

Various embodiments of the invention have been described. The descriptions are intended to be illustrative, not limitative. Thus, it will be apparent to one skilled in the art that certain modifications may be made to the invention as described herein without departing from the scope of the claims set out below.

We claim:

1. A haptic interface device comprising:
   a haptic output device capable of providing a plurality of haptic outputs;
   a haptic clutch coupled to the haptic output device and configured to engage a haptic model to varying degrees based at least in part on an input received via the haptic output device; wherein
   the haptic output device is configured to output in response to an interaction with an environment with which the haptic model is associated (1) a first selected one of the plurality of haptic outputs in the event the haptic clutch is engaged to a first degree or (2) a second selected one of the plurality of haptic outputs in the event the haptic clutch is engaged to a second degree, such that the haptic output provided in response to the interaction may be varied while the interaction is taking place by varying the degree of engagement of the haptic clutch; and
   an environment interaction controller adapted to receive a clutch input; wherein:
   the haptic clutch selectively engages the haptic model according to the clutch input;
   the environment interaction controller is further adapted to receive an interaction input;
   the haptic model responds to the interaction input; and
   the clutch input and the interaction input are forces along different axis.

2. A haptic interface device as recited in claim 1 wherein the plurality of haptic outputs comprises a single type of haptic output at a plurality of haptic output levels.

3. A haptic interface device as recited in claim 1 wherein:
   the clutch input includes a translational force applied to a dial and the interaction input includes a rotational force applied to the dial.

4. A haptic interface device as recited in claim 1 wherein the haptic output includes texture sensation.

5. A haptic interface device as recited in claim 1 wherein the haptic output includes audio or video frames.

6. A haptic interface device as recited in claim 1 wherein the degree of engagement is selected from a plurality of values according to the clutch input.

7. A haptic interface device as recited in claim 1 wherein:
   the degree of engagement is selected from a plurality of values according to the clutch input;
   the clutch input has a plurality of ranges; and
   the degree of engagement selected corresponds to one of the plurality of clutch input ranges.

8. A haptic interface device as recited in claim 1 further comprising a non-haptic output device adapted to output non-haptic information related to the haptic output.

9. A method for interacting with a haptic interface device comprising:
   receiving a clutch input via an environment interaction controller adapted to receive the clutch input and receive an interaction input; wherein the clutch input and the interaction input are forces along different axis;
   using a haptic clutch to engage a haptic model to varying degrees based at least in part on an input received via a haptic output device; wherein the haptic clutch selectively engages the haptic model according to the clutch input, the haptic model responds to the interaction input the haptic clutch is coupled to the haptic output device, and the haptic output device is capable of providing a plurality of haptic outputs; and
   configuring the haptic output device to output in response to an interaction with an environment with which the haptic model is associated (1) a first selected one of the plurality of haptic outputs in the event the haptic clutch is engaged to a first degree or (2) a second selected one of the plurality of haptic outputs in the event the haptic clutch is engaged to a second degree, such that the haptic output provided in response to the interaction may be varied while the interaction is taking place by varying the degree of engagement of the haptic clutch.

10. A computer interface for providing interaction between a user and a computer system comprising:
   a haptic output device capable of providing a plurality of haptic outputs; a haptic clutch coupled to the haptic output device and configured to engage a haptic model to varying degrees based at least in part on an input received via the haptic output device; wherein
   the haptic output device is configured to output in response to an interaction with an environment with which the haptic model is associated (1) a first selected one of the plurality of haptic outputs in the event the haptic clutch is engaged to a first degree or (2) a second selected one of the plurality of haptic outputs in the event the haptic clutch is engaged to a second degree, such that the haptic output provided in response to the interaction may be varied while the interaction is taking place by varying the degree of engagement of the haptic clutch; and
   an environment interaction controller adapted to receive a clutch input; wherein:
   the haptic clutch selectively engages the haptic model according to the clutch input;
   the environment interaction controller is further adapted to receive an interaction input;
   the haptic model responds to the interaction input; and
   the clutch input and the interaction input are forces along different axis.

* * * * *